Patented June 29, 1954

2,682,480

UNITED STATES PATENT OFFICE 2,682,480

COMPOSITION FOR AND METHOD OF APPLYING CERAMIC COLOR

Ray Andrews, Washington, Pa., assignor to B. F. Drakenfeld & Co., Inc., Washington, Pa., a corporation of New York No Drawing. Application February 10, 1950, Serial No. 143,604

12 Claims. (Cl. 117—38)

This invention relates to a method of and compositions for the application of ceramic colors for decorative, descriptive and related purposes, and this application is a continuation-in-part of my copending application Serial No. 1,267, filed January 8, 1948, and now abandoned.

For many years glass and other ceramic surfaces have been decorated or provided with descriptive or informative matter by applying thereto vitrifiable compositions or glazes, commonly called ceramic colors, that are subsequently fused in place. Such colors have been applied in various ways but more recently this has been done extensively by application of the color through a silk or wire screen stencil, i. e., the so-called screen process. For that purpose the vitrifiable color, or glaze, has been dispersed in a medium that permits its ready application through the silk screen stencil and acts to hold the applied material in place until the firing step. Generally speaking, the trade has referred to such suspensions as color pastes, or paints, because they are fluid, like paint, at normal room temperatures before drying. Because of the mode of applying them through the screen these suspending vehicles are referred to commonly as squeegee oils.

The color paste compositions used for such purposes must, to be fully satisfactory, meet various requirements. For example, the suspending medium must contain or act as a film former to hold the color in place until it is fused onto the surface to be decorated, and the binding medium and all other organic matter of the composition must be volatilized before the inorganic ceramic color fuses. The suspending medium must likewise permit the composition to pass through the openings in the stencil screen for uniform and ready application of the color through the screen to the glass or other ceramic surface, i. e., the paste must print sharply with only enough after-flow to allow it to level off and remove screen marks. On the other hand, the applied paste must not run, after application or during heating, sufficiently to distort or detrimentally affect the desired outline.

Again, the suspending medium must not affect the hue or tint intended to be produced by the ceramic color, and all of the organic or non-ceramic constituents must volatilize before the frit, carrying the color, fuses, and without the production of any appreciable carbonaceous residue or blistering of the glaze. Another requirement is that the constituents shall neither have harmful effects upon workmen nor odor objectionable to them. Commonly also, the film forming constituent that acts as a temporary binder for the ceramic color must be plasticized.

Up to the time of this invention the practice has been consistently, as far as I am aware, to use color pastes or oils containing volatile liquids in amounts to be free-flowing, or liquid, at normal temperatures. For example, at one time there were used compositions of paint consistency made from such materials as copaiba oil, linseed oil, kerosene, and the like, in which the color was suspended. A type of composition that has been widely used recently comprises a suspension of the finely ground ceramic color in a normally fluent solution of ethyl cellulose in pine oil, with or without such resinous materials as dammar varnish or copaiba balsam. When the pine oil or other solvent is evaporated from such a composition after application to a glass or the like surface, the ethyl cellulose and other resinous material, if any, acts as temporary binder to hold the color in place until it is fired. Such compositions may also contain other materials intended to improve the leveling-off characteristics, or to plasticize the resin film to reduce brittleness or dusting during handling prior to the firing step. Examples of such prior art compositions, typical in general of all of those used prior to my invention, are to be found in Patents Nos. 1,651,476, 2,316,745, 2,379,507, and others.

Although compositions generally meeting the foregoing requirements have been available, all of them have been subject to the disadvantage that where more than one color is to be applied to a given article, such as a bottle, it has been necessary to subject the article to a drying operation after the application of each color, except the last, in preparation for the application of the next color because otherwise the decorative effect would be impaired due to smearing of the wet applied color, or to intermingling of two or more colors, and the like. In multi-color work, therefore, it has been necessary to pass the articles through a drying oven after the application of each color except the one last applied. Obviously this has necessitated the expense of installation and operation of those ovens, it has required appreciable floor space in addition to that of the color applying devices and the firing lehr, and it has lengthened the processing time.

Likewise, screen stencil printing has not been satisfactory in the production of porcelain coated iron when, as is common, the ceramic color has been applied to the bisque. That is, the squeegee oils used before this invention soaked into the porcelain frit, or bisque, and caused upheaval in firing in consequence of the evaporation of the volatile constituents of the squeegee oil vehicle, which of course ruined the appearance of the product.

The silk screen process would likewise be adapted to the lithographing of sheet metal, e. g., tin plate or black iron sheet, or of cardboard and the like receptive bases, were it not for the necessity of drying, indicated above, with the oils, or pastes, known and used prior to this invention.

A major object of this invention is to provide ceramic color vehicle compositions that meet the foregoing and other requirements of such materials, particularly when applied by the screen stencil process, which wholly eliminate the drying or heating stages referred to above while producing perfect application of one or a plurality of colors, which may be prepared readily from commonly available materials and are relatively inexpensive, in the use of which no change in practice is necessitated other than elimination of drying between application of successive colors, and which are adapted to the printing of all types of ceramic bases while avoiding the troubles alluded to above.

A further object is to provide a method of decorating glass and metal surfaces with ceramic colors, particularly by the screen process, in which use is made of compositions in accordance with the foregoing object, and the practice of which wholly eliminates the necessity for intermediate drying stages in multi-color work.

Other objects will appear hereinafter.

I have discovered that the disadvantages attendant upon the previously used ceramic color pastes, or squeegee oils, in free-flowing form are eliminated by suspending, or dispersing, the ceramic color in a vehicle comprising a thermoplastic resin, a solvent for the resin, and a wax, as described more fully hereinafter. In all cases, however, the vehicle is solid at normal room temperatures, it is meltable when heated to moderately elevated temperatures, and it hardens substantially immediately upon contact with the glass or other receptive base when applied thereto, and it is in these particulars that I depart from prior practices. In this way I am able to apply the colors by existing practices while avoiding wholly the necessity for drying intermediate the application of two or more different colors, with consequent major advantage through elimination of the cost of installing and operating drying ovens, or of supplying drying space, and with reduction in the length of the time cycle.

In the practice of the invention the ceramic color may be any of the inorganic coloring agents known by that term in the trade. Where the article to be printed is to be fired, the ceramic color may be carried in a ceramic frit (i. e. vitrifiable base) either by being milled with the frit as a mill addition or by being fused into the frit in its production, particularly in the case of certain blue shades. The term "ceramic color" as used herein thus applies to the coloring agent, such as cadmium sulfide selenide red, while the term "ceramic frit carrying ceramic color" contemplates a vitrifiable frit carrying the inorganic coloring agent whether the latter is fused in the frit or is a mill addition to it.

A wide variety of thermoplastic resins are utilizable in the practice of this invention. It is essential that the resin be volatilizable, i. e., that it distill out, or fire away, without objectionable residue before the frit matures and without causing bubbles or foaming of the frit. Among those available for such use I now prefer to use resinous wood product thermoplastic resins. Ordinary wood rosin may be used but some difficulty may be encountered in firing it completely away. I find, however, that excellent results for most purposes are to be had with hydrogenated wood rosin, such, for example, as that sold as "Staybelite resin" by the Hercules Powder Company, and which is a hard, brittle hydrogenated rosin said to have a melting point of 168° F., a specific gravity of 1.045 (20° C.) and to be of acid number 162. Wood rosin and limed wood rosin are particularly desirable for the purposes of the invention, not only because they produce vehicles of good workability and other characteristics requisite for screen stencil printing, but also because they wet glass, which is essential for sharp and satisfactory printing on ceramic surfaces. Limed wood rosin (5 per cent lime) is likewise utilizable, and likewise wets glass.

A variety of other thermoplastic resins of diverse character are also utilizable in the practice of the invention in the printing of ceramic surfaces. Thus, satisfactory results have been had with such materials as normal butyl methacrylate ("Acryloid SF 100," Resinous Products and Chemicals Co.); the resinous chlorinated diphenyls, e. g., "Aroclor" 1262 and 4465 sold by Monsanto Chemical Co.; natural and isomerized synthetic rubber sold as "Pliolite" by the Goodyear Tire and Rubber Co.; the alkyd resin sold as "Aeroplaz 905" by Strook and Wittenberg; "Rosin Amine D Formaldehyde" sold by Hercules Powder Co.; and the various grades of ethyl cellulose, although the higher viscosity grades are desired.

The foregoing thermoplastic resins may be used also in vehicles for lithography on metal. For these purposes other thermoplastic resins that do not fire away, or volatilize readily, may be used. Examples are phenol-formaldehyde thermoplastics; urea-formaldehyde thermoplastic resins; coumarone and indene resins; and such modified rosin thermoplastics as those sold by Hercules Powder Co. as "Pentalyn" (pentaerythritol esters of rosin), and "Staybelite" esters No. 1 (ethylene glycol ester of hydrogenated rosin), No. 2 (diethylene glycol ester of rosin), No. 3 (triethylene glycol ester of rosin), and No. 10 (glyceryl ester of hydrogenated rosin).

It is generally true that these resins fuse at temperatures too high for easy and economical operation in accordance with the invention. Consequently, a feature of the invention is that the vehicle in which the ceramic color is dispersed comprises also a solvent for the thermoplastic resin. Various solvents may be used but I have found that the solvents sold as "Abalyn" (a light amber-colored liquid ester of rosin of sp. gr. 1.020–1.025, B. P. 680° F.) and "Hercolyn" (a hydrogenated methyl ester of rosin, B. P. 689° F.) by Hercules Powder co., or "Rosin Amine D" (itself a solvent although it forms a resin with formaldehyde) are generally useful with the foregoing resins. Normal butyl methacrylate requires, however, a high boiling petroleum solvent, such as those boiling in the range 250° to 500° C. It will be seen that such solvents are of a high boiling point in comparison with ordinary aromatic solvents such as benzene and toluene.

The amount of solvent used in formulating the vehicle will depend, of course, upon the particular solvent, the particular resin, and the desired melting temperature of the composition. For most purposes the minimum practical melting temperature is about 140° F., and a range good for most purposes is 140° to 200° F. The melting temperature in turn will depend on whether the printing operation is manual or automatic (higher temperatures can be used with automatic printing), and on the effect of temperature on the squeegee rubber. It will depend also on the ambient temperature; i. e., in summer or tropic conditions, or where abnormally hot factory conditions prevail, higher melting temperature is desirable than other otherwise.

The amount of solvent used is, of course, such that the composition is solid at normal room temperatures, which is critical to the invention, but such that the composition melts at a satisfactorily operative temperature. This will in turn depend on the melting temperature desired, the particular resin or resins, and the particular solvent or solvents used.

A major, and critical, feature of the invention is prompt solidification of the composition upon application to the receptive base, whether ceramic or metal. This I accomplish by including in the vehicle a wax, or wax-like substance, in excess of its solubility in the vehicle at normal room temperatures. When the vehicle is melted the wax will be in solution but when the composition contacts the cooler receptive base the supersaturation relative to the wax at that temperature causes it to crystallize out promptly with concurrent solidification of the entire composition, whereby drying by standing or by heating becomes unnecessary before application of further color.

Such sharp solidification may be effected with various waxes or wax-like materials. I believe now that any of the synthetic waxes sold by Armour & Co. as "Armids" (high melting aliphatic amides) may be used for this purpose but I prefer that sold as "Armid HT" (composed of amides of hexadecane, octadecane and octadecene, M. P. about 97° C.). Stearic and palmitic acids may be used also, and they are desirable also to lower the melting point of the higher melting thermoplastic resins. Any of the grades of "Carbowax" that are solid at room temperature may be used for this purpose also, as well as their stearates and oleates. Other suitable waxes are those made by reaction of such solid acids as stearic, adipic and phthalic with the fatty amines sold as "Armeens" (mixtures of long chain alkyl amines containing 6 to 18 carbon atoms) by Armour & Co. Mixtures of two or more waxes may, of course, be used.

The amount of wax used will, of course, depend upon the particular resin or resins, the particular wax or waxes, the resin solvent, and the ambient temperature. Naturally, therefore, numerical ranges applicable to all combinations and conditions cannot be set. However, to repeat, the wax is present in excess of its solubility limit in the vehicle at normal room temperatures so that the composition will solidify promptly upon being cooled from the molten state. Enough wax must be present also so that the composition will solidify hard rather than tacky or pasty.

As indicated above, any of the resins named may be used for lithography of metals. Of the resins listed only wood rosin and limed wood rosin wet ceramic surfaces satisfactorily and for that reason the vehicles should contain one or the other of them. If one of them is present in appreciable amount, the other resins may be used also. But if neither wood rosin nor limed rosin is present and the composition is to be applied to a ceramic surface, then the vehicle should contain a wetting agent also, and "Carbowax 4000" serves admirably for this purpose, say in the proportion of 2 to 10 per cent by weight of the vehicle.

The viscosity of the composition is important to production of the most acceptable printing. Thus, in addition to freedom from undesired flow coupled with satisfactory levelling off, there is to be avoided back lap due to sucking of composition through the screen as it leaves the receptive surface following the forward movement of the screen. Depending on the resin and solvent used, the viscosity may need no adjustment; in other cases a bodying agent may be needed. For such purposes ethyl cellulose may be incorporated in the vehicle. The higher viscosity grades are preferred, e. g., N 200, because less is needed than with low viscosity grades. For most purposes 1 to 10 per cent of bodying agent, by weight of the vehicle suffices.

The amount of ceramic color, or of ceramic frit carrying the color, used in the composition will depend on various factors. Thus, it will depend on the color itself, on whether it is to be applied directly to the receptive surface or over a previously applied color, and on whether the color is applied directly to a receptive base such as glass or metal. These and related factors will be understood by those familiar with the art of screen stencil printing of ceramic colors. For many purposes, however, the ratio of color (whether alone or carried by frit) to vehicle may vary from 1:1 to 6:1, by weight.

A vehicle that I have found to be suitable for screen printing in general is composed of equal parts by weight of hydrogenated wood rosin, hydrogenated methyl ester of rosin, and stearic acid amide. To this may be added about 4 per cent of N 200 ethyl cellulose, and 6 per cent of Carbowax 4000, which is a hard, waxy polyethylene glycol sold by Carbide and Carbon Chemicals Corporation.

Other examples of suitable vehicles are, in parts by weight:

*Example 2*

| | |
|---|---|
| Ethyl Celluose N–200 | 1 |
| "Carbowax" 4000 | 5 |
| "Abalyn" | 20 |
| "Armeen" 18 D stearamide | 15 |

*Example 3*

| | |
|---|---|
| "Acryloid" SF 100 | 10 |
| Petroleum solvent | 25 |
| "Armid" HT | 15 |

*Example 4*

| | |
|---|---|
| "Abalyn" | 20 |
| Stearic acid | 15 |
| "Carbowax" 4000 | 5 |
| Ethyl cellulose N–200 | 2 |
| "Staybelite" | 5 |

*Example 5*

| | |
|---|---|
| Limed wood rosin (5%) | 10 |
| "Abalyn" | 15 |
| "Armid" HT | 15 |
| Ethyl cellulose N–200 | 0.75 |

Example 6

| | |
|---|---|
| Limed wood rosin (5%) | 10 |
| "Abalyn" | 15 |
| "Armid" HT | 5 |

Example 7

| | |
|---|---|
| "Aeroplaz" 905 | 10 |
| Ethyl cellulose N–200 | 1 |
| "Carbowax" | 5 |
| "Armid" HT | 15 |
| "Abalyn" | 30 |

Example 8

| | |
|---|---|
| "Staybelite" | 5 |
| Ethyl cellulose N–200 | 2 |
| "Carbowax" 4000 | 5 |
| "Armid" HT | 15 |
| "Abalyn" | 30 |

The vehicle of Example 8 melts at about 170° F. As exemplifying the effect of stearic acid, the addition of 9 per cent by weight lowers the fusion point to 140° F., and it acts also as wax to cause rapid solidification as described above.

Example 9

| | |
|---|---|
| Stearic acid | 30 |
| 5% Limed wood rosin | 10 |
| Pliolite R–108 | 15 |

The composition of Example 9 gives excellent results. It will be observed that it contains no substance that is liquid at room temperatures; in this instance the stearic acid functions both as solvent and also as wax.

The compositions provided are solids at room temperature. Upon heating they melt, and the suitably pulverized ceramic color, or frit carrying ceramic color, may then be stirred into the liquid which is kept molten, and the melted suspension is then used for application by desired means, most suitably the screen, or squeegee, process. They print sharply and perfectly satisfactorily, and the applied composition solidifies promptly upon contact with the cold bottle or other receptive base to which it is applied. The base is then ready for immediate application of another color, dispersed in a vehicle in accordance with the invention, thus eliminating the drying step that has heretofore been essential.

Commonly, the application of heat, as from infrared lamps, to the stencil screen is necessary to keep the composition from solidifying in the screen openings.

Of course, the thermoplastic resins and other vehicle constituents used for the purposes of this invention must possess the general requirements outlined above. They must be capable of sharply reproducing the stencil design, they must not affect the shade or hue producible by the ceramic color, they should produce compositions having good shelf life, and the non-inorganic matter must volatilize during firing without leaving any sensible, or objectionable residue.

From what has been said it will be understood that where the receptive base is to be fired the ceramic color is carried by a frit that fuses to the base as a result of the firing.

The invention possesses major advantages in addition to those described above. For example, automatic machinery for applying the colors is of simplified design as compared with the machinery used heretofore, and greater ease and accuracy of registering two or more colors results from the invention. Likewise, color impressions are sharper and of better definition, and rejects due to smearing are decreased, as compared with practice using the normally liquid squeegee oils of the prior art.

According to the provisions of the patent statutes, I have explained the principle of my invention and described what I now consider to represent its best embodiment. However, I desire to have it understood that, within the scope of the appended claims, the invention may be practiced otherwise than as specifically described.

I claim:

1. Composition for supplying ceramic color through a screen stencil to a ceramic receiving surface, the composition comprising a dispersion of enamel frit carrying a ceramic color in a vehicle comprising a thermoplastic resin, a solvent for said resin, and a wax in excess of its solubility in the composition at normal room temperatures, said composition being proportioned to be solid at normal room temperatures, and the vehicle being meltable to prepare the composition for application to the receiving surface, the vehicle solidifying promptly upon application thereto to form a sharp reproduction of the stencil design, and said vehicle being volatilizable prior to fusion of said frit without leaving objectionable residue thereof when the applied composition is heated to a temperature to fuse said frit, and the sharpness of said reproduction being retained when the frit is fused.

2. Composition according to claim 1, the composition containing also a wetting agent.

3. Composition according to claim 1, said resin being wood product resin.

4. Composition according to claim 1, said resin being hydrogenated wood rosin.

5. Composition for supplying ceramic color through a screen stencil to a ceramic receiving surface, the composition comprising a dispersion of enamel frit carrying a ceramic color in a vehicle comprising substantially equal parts by weight of hydrogenated rosin, hydrogenated ester of rosin, and stearic acid amide, said composition being solid at normal room temperatures and the vehicle being meltable to prepare it for application to the ceramic surface, and the composition solidifying promptly upon application thereto to form a sharp reproduction of the stencil design, and said vehicle being volatilizable without leaving objectionable residue thereof when the applied composition is heated to a temperature to fuse said frit.

6. Composition according to claim 5, said ester being the methyl ester.

7. That method of applying ceramic color to a ceramic or sheet metal receiving base which includes the steps of applying to said base through a screen stencil a melted ceramic color-containing composition that comprises an enamel frit carrying ceramic color dispersed in a vehicle comprising a thermoplastic resin, a solvent for said resin, and a wax in excess of its solubility therein at normal room temperatures, said composition being proportioned to be solid at normal room temperatures, and the vehicle being meltable when heated, solidifying promptly upon application to said base to form a sharp reproduction of the stencil design from which the constituents of said vehicle are volatilized prior to fusion of said frit without leaving objectionable residue when fired on said base, then applying, without intermediate drying or heating, through a screen stencil to the base further enamel frit carrying a different ceramic color dispersed in said vehicle, and finally heating the base with the thus applied material to volatilize said vehicle and to leave the enamel frit carrying ceramic color on and fuse it to said base while retaining the sharpness of said reproduction.

8. Method according to claim 7, said composition including also a wetting agent.

9. Method according to claim 7, said resin being wood product resin.

10. Method according to claim 9, said resin being hydrogenated rosin.

11. That method of applying ceramic color to a ceramic or sheet metal receiving base which includes the steps of applying to said base through a screen stencil a melted ceramic color-containing composition that comprises an enamel frit carrying ceramic color dispersed in a vehicle comprising substantially equal parts by weight of hydrogenated rosin, hydrogenated ester of rosin, and stearic acid amide, said vehicle being solid at normal room temperatures, meltable when heated, solidifying promptly upon application to said base to form a sharp reproduction of the stencil design and from which the constituents of said vehicle are volatilized without leaving objectionable residue when fired on said base, then applying, without intermediate drying or heating, through a screen stencil to the base further enamel frit carrying a different ceramic color dispersed in said vehicle, and finally heating the base with the thus applied material to volatilize said vehicle and to leave the enamel frit carrying ceramic color on and fuse it to said base.

12. Method according to claim 11, said ester being the methyl ester.

References Cited in the file of this patent

UNITED STATES PATENTS

| Number | Name | Date |
|---|---|---|
| 1,875,721 | Frost | Sept. 6, 1932 |
| 2,122,543 | Tomsicek et al. | July 5, 1938 |
| 2,141,575 | Warp | Dec. 27, 1938 |
| 2,142,039 | Abrams et al. | Dec. 27, 1938 |
| 2,261,091 | Maguire | Oct. 28, 1941 |
| 2,316,745 | Robertson et al. | Apr. 13, 1943 |
| 2,346,579 | Henderson | Apr. 11, 1944 |
| 2,361,740 | Boggs et al. | Oct. 31, 1944 |
| 2,379,507 | Deyrup | July 3, 1945 |
| 2,451,212 | Gold | Oct. 12, 1948 |
| 2,500,427 | Moose | Mar. 14, 1950 |